(12) United States Patent
Marechal et al.

(10) Patent No.: US 9,970,399 B2
(45) Date of Patent: May 15, 2018

(54) VALVE ASSEMBLY

(71) Applicant: DELPHI TECHNOLOGIES IP LIMITED, St. Michael (BB)

(72) Inventors: Michel Marechal, Chouzy sur Cisse (FR); Etienne Pereira, Cande-sur-Beuvron (FR); Raphael Rouillon, Onzain (FR); Christophe Breant, Saint Suplice de Pommeray (FR)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days. days.

(21) Appl. No.: 14/415,033

(22) PCT Filed: May 29, 2013

(86) PCT No.: PCT/EP2013/061053
§ 371 (c)(1),
(2) Date: Jan. 15, 2015

(87) PCT Pub. No.: WO2014/012695
PCT Pub. Date: Jan. 23, 2014

(65) Prior Publication Data
US 2015/0198126 A1    Jul. 16, 2015

(30) Foreign Application Priority Data

Jul. 19, 2012 (EP) .................... 12177129

(51) Int. Cl.
| | |
|---|---|
| *F02M 59/36* | (2006.01) |
| *F02M 59/46* | (2006.01) |
| *F02M 63/00* | (2006.01) |
| *F04B 7/00* | (2006.01) |
| *F16K 31/06* | (2006.01) |

(Continued)

(52) U.S. Cl.
CPC ........ *F02M 59/466* (2013.01); *F02M 59/366* (2013.01); *F02M 59/368* (2013.01);
(Continued)

(58) Field of Classification Search
CPC ................................................ F02M 59/368
(Continued)

(56) References Cited

U.S. PATENT DOCUMENTS

| | | | | |
|---|---|---|---|---|
| 4,008,876 A | * | 2/1977 | Bastle ................ | F16K 31/0655 251/129.19 |
| 6,056,264 A | | 5/2000 | Benson et al. | |

(Continued)

FOREIGN PATENT DOCUMENTS

| | | |
|---|---|---|
| DE | 10 2008 018018 A1 | 10/2009 |
| DE | 10 2010 027745 A1 | 10/2011 |

(Continued)

OTHER PUBLICATIONS

WO 2011060989, May 2011, DE, Szermutzky.*
International Search Report dated June 27, 2013.

*Primary Examiner* — Kevin Murphy
*Assistant Examiner* — Paul J Gray
(74) *Attorney, Agent, or Firm* — Joshua M. Haines

(57) ABSTRACT

An inlet valve assembly for a high-pressure fuel pump is disclosed. The inlet valve assembly comprises an inlet valve member moveable between open and closed positions to control the fuel flow from a source of low-pressure fuel to a pumping chamber of the fuel pump, a first biasing spring arranged to apply a first force to the valve member in an opening direction, a second biasing spring arranged to apply a second force to the valve member in a closing direction, and an actuator arrangement operable to remove the first force from the valve member, thereby to allow the valve member to move into its closed position.

17 Claims, 2 Drawing Sheets

(51) Int. Cl.
  *H01F 7/16* (2006.01)
  *F16K 1/32* (2006.01)

(52) U.S. Cl.
  CPC .... *F02M 63/0022* (2013.01); *F02M 63/0035* (2013.01); *F04B 7/0076* (2013.01); *F16K 1/32* (2013.01); *F16K 31/0655* (2013.01); *H01F 7/1607* (2013.01); *F02M 2200/502* (2013.01)

(58) Field of Classification Search
  USPC ........................................ 251/129.02, 129.16
  See application file for complete search history.

(56) References Cited

U.S. PATENT DOCUMENTS

| | | | | |
|---|---|---|---|---|
| 6,974,120 | B2* | 12/2005 | Wilson | ................... B01D 35/16 137/614.11 |
| 2006/0237672 | A1* | 10/2006 | Moreno | .............. F16K 31/0655 251/129.02 |
| 2008/0203347 | A1* | 8/2008 | Burrola | .................. F02M 55/04 251/284 |
| 2009/0184276 | A1* | 7/2009 | Olberding | ................. F16K 1/16 251/313 |
| 2009/0301081 | A1* | 12/2009 | Thiery | ................... F02B 37/16 60/602 |
| 2009/0320800 | A1* | 12/2009 | Ricco | .................. F02M 47/027 123/472 |
| 2012/0301340 | A1 | 11/2012 | Aritomi et al. | |
| 2013/0022484 | A1 | 1/2013 | Fuchs et al. | |

FOREIGN PATENT DOCUMENTS

| | | |
|---|---|---|
| EP | 1921307 A1 | 5/2008 |
| EP | 1 965 069 A2 | 9/2008 |
| GB | 2 180 039 A | 3/1987 |
| JP | H03156166 A | 7/1991 |

\* cited by examiner

VALVE ASSEMBLY

CROSS REFERENCE TO RELATED APPLICATIONS

This application is a national stage application under 35 U.S.C. 371 of PCT Application No. PCT/EP2013/061053 having an international filing date of 29 May 2013, which designated the United States, which PCT application claimed the benefit of European Patent Application No. 12177129.9 filed on 19 Jul. 2012, the entire disclosure of each of which are hereby incorporated herein by reference.

FIELD OF THE INVENTION

The present invention relates to an inlet valve assembly suitable for use in a fuel pump. In particular, the invention relates to an inlet valve assembly for a pump head of a high-pressure fuel pump for use in a common rail fuel injection system.

BACKGROUND TO THE INVENTION

High-pressure fuel pumps for common rail fuel injection systems typically comprise one or more hydraulic pump heads in which fuel is pressurised in a pumping chamber of the pump head by the reciprocating movement of a plunger.

Typically, low-pressure fuel is delivered to the pump head by a low-pressure lift pump in the fuel tank and/or by a transfer pump built into the high-pressure fuel pump. The low-pressure fuel is drawn into the pumping chamber through an associated inlet valve on a filling or return stroke of the plunger, during which the volume of the pumping chamber increases. On a pumping or forward stroke of the plunger, the inlet valve closes and the volume of the pumping chamber decreases, resulting in an increase in the fuel pressure within the pumping chamber. At a pre-determined pressure, an outlet valve associated with the pumping chamber opens to allow the high-pressure fuel out of from the pumping chamber to the common rail for delivery to the fuel injectors.

The fuel pressure in the common rail, which determines the fuel injection pressure, may be varied from a moderate pressure of a few hundred bar at low engine loads and speeds to a very high pressure of up to 3000 bar or more at high engine loads and speeds.

To regulate the fuel pressure in the common rail, an additional control valve, known as an inlet metering valve, may be provided upstream of the inlet valve of the pumping chamber. The inlet metering valve is used to control the amount of fuel that enters the pumping chambers of the fuel pump, and consequently the quantity of fuel that is compressed and delivered to the common rail at high pressure with each plunger stroke.

A conventional inlet metering valve is effectively a controllable orifice, which acts to throttle the flow of fuel to the inlet valve of the high-pressure pump. In this way, only the amount of fuel required by the engine is delivered to the rail, thereby saving both fuel and energy compared to the situation where fuel is fed by the lift or transfer pump at constant full delivery. The inlet metering valve is under the control of the engine control unit, which determines the desired rail pressure and the actual rail pressure and adjusts the inlet metering valve accordingly.

There are several disadvantages in the use of conventional inlet metering valves. In particular, inlet metering valves can be expensive and add to the overall cost of the common rail injection system, which is undesirable. Secondly, inlet metering valves are relatively large and space-consuming components. Thirdly, inlet metering valves can be vulnerable to wear and to damage due to low-quality fuels. Furthermore, in some arrangements, the use of a conventional inlet metering valve means that the metering/rail pressure control mechanism is relatively far from the pumping chamber of the high-pressure fuel pump, which leads to undesirable delays in rail pressure control.

In an alternative arrangement, the inlet valve for the pumping chamber is provided with an actuator arrangement which allows the inlet valve to be closed in response to a signal from the engine's electronic control unit. In this way, the quantity of fuel that enters the pumping chamber during the filling stroke of the plunger can be regulated without the need for an additional inlet metering valve. Such arrangements are described in DE 10 2008 018018 and EP 1921307. EP 1921307 also describes the use of the inlet valve as a spill valve to return high-pressure fuel from the pumping chamber to the fuel rail during the pumping stroke of the plunger.

Typically, electronically-controllable or switchable inlet valves are actuated by a solenoid actuator arrangement operable to control the movement of a poppet-type inlet valve member that is received within a bore in the pump head. An armature is attached to a valve stem of the valve member, and a head portion of the valve member is engageable with an associated seat formed at the end of the bore. When the solenoid is energised, the armature is drawn towards a core of the solenoid against the force of a biasing spring, which biases the valve stem into a normally-open position.

In practice, the performance of such solenoid-actuated inlet valves can be compromised by several factors. For example, the inlet valve is in its fully-open position, it is desirable that the cross-sectional area available for fuel to flow between the valve head and the valve seat is as large as possible, to maximise the flow of fuel into the pumping chamber at high engine loads. For this reason, the stroke of the valve member between its fully-open position and its fully-closed position must be relatively long. This, in turn, means that the air gap between the armature and the core is relatively large when the valve is fully open. Since the force applied to the armature of a solenoid actuator decreases significantly as the air gap increases, a relatively large and expensive solenoid must be used to achieve the force necessary to close the valve.

Furthermore, as a result of wear of the valve member and/or the valve seat, the stroke of the valve member between its fully-open and fully-closed positions can vary over time, resulting in variations in the air gap between the armature and the core over the service life of the inlet valve. Similarly, when a lift stop arrangement is provided to limit movement of the valve member beyond its fully-open position, wear of the lift stop arrangement can result in an increased air gap when the valve member is fully open. Thus the force required to close the valve can vary during use of the valve, which can reduce the performance and controllability of the valve arrangement.

Also, in such an arrangement, the armature is typically in the form of a collar that is press-fitted or otherwise attached to the valve stem. Any variation in concentricity between the armature and the valve stem, and between the armature and the core, can result in undesirable side-loads that can cause excessive wear of the valve member and the valve seat during the service life of the inlet valve. Because the inlet valve is subject to very high fuel pressures, such wear can seriously impair the performance and reliability of the valve.

The inlet valve must therefore be manufactured with very tightly-controlled tolerances in the dimensions and concentricity of the parts, which increase manufacturing complexity and cost.

Against this background, it would be desirable to provide an electronically-controllable inlet valve assembly for the pump head of a high-pressure fuel pump which substantially overcomes or mitigates at least some of the above-mentioned problems.

SUMMARY OF THE INVENTION

From one aspect, the present invention resides in an inlet valve assembly for a high-pressure fuel pump, comprising an inlet valve member moveable between open and closed positions to control the fuel flow from a source of low-pressure fuel to a pumping chamber of the fuel pump, a first biasing spring arranged to apply a first force to the valve member in an opening direction, a second biasing spring arranged to apply a second force to the valve member in a closing direction, and an actuator arrangement operable to remove the first force from the valve member, thereby to allow the valve member to move into its closed position.

In this arrangement, the actuator arrangement does not act directly on the valve member. Instead, closure of the valve member is achieved indirectly, by removing the first force from the valve member to allow the opposing second spring to close the valve member. In this way, the actuator arrangement need not be fixedly connected to the valve member, allowing greater tolerance of dimensional variations and in particular variations in the concentricity of the valve member and the actuator arrangement. As a result, the dimensional tolerances of the components of the valve assembly are less critical, and so the cost and complexity of manufacturing the valve assembly can be reduced.

Preferably, the actuator arrangement is an electromagnetic actuator comprising a core member, a solenoid coil, and an armature moveable towards the core member in response to energisation of the coil. Because the operation of the actuator arrangement is not directly linked to the movement of the valve member, wear of the valve member or its associated seating surface in use does not change the range of movement of the armature, and in particular the distance between the armature and the core member, even though such wear may alter the range of movement of the valve member itself. In this way, the valve assembly is less likely to suffer from performance degradation and unreliable operation over its service life.

The actuator arrangement is preferably operable to retract the first biasing spring towards the core member. For example, the actuator arrangement may compress the first biasing spring between the armature and the core member upon energisation of the coil.

In one embodiment, the armature is separated from the valve member by an annular clearance. Advantageously, the annular clearance ensures that the armature does not constrain the valve member in a radial direction, allowing greater tolerance for axial misalignment and concentricity variations between the parts.

The first spring preferably biases the armature into engagement with the valve member. For example, the armature may engage with a collar of the valve member. The armature may be generally tubular, with an inwardly-directed flange at one end to engage with the collar. The collar is preferably press-fitted or crimped onto the valve member.

In one arrangement, the collar comprises a spring seat for the second spring. Alternatively, or in addition, the collar may comprise a lift stop for limiting the opening movement of the valve member. In other arrangements, a separate spring seat and/or lift stop may be provided.

The collar is preferably formed from a non-magnetic material. In this way, the collar helps to guide the magnetic field that arises when the coil is energised and, in particular, helps to prevent the magnetic circuit from straying from the armature into the valve member.

The armature may disengage from the valve member when the valve member is in its closed position. This maximises the ability of the armature to move independently of the valve member, so as to accommodate dimensional tolerances or misalignment of the components.

A non-magnetic spacer member may be disposed between the armature and the core member. For example, the spacer member may be in the form of a non-magnetic washer, fixed to the face of the armature closest to the core member.

The core member may include an extended portion that overlaps with the armature during at least a part of the range of movement of the armature. In this way, the maximum gap between the core member and the armature can be larger, for a given core and armature size, than would be the case if no extended portion were present. Thus the range of movement of the valve member can be relatively large, maximising the rate at which fuel can flow through the inlet valve assembly to fill the pumping chamber. Said another way, for a given maximum gap between the armature and the core member, the presence of the extended portion of the core member allows a smaller coil to be used than would otherwise be the case. Thus the size of the valve assembly can be reduced.

The extended portion preferably overlaps with the armature along the axis of movement of the armature over the whole range of movement of the armature. The extended portion may, for example, comprise an annular projection that extends from a face of the core member. The extended portion preferably defines a recess that receives, in part, the armature.

The inlet valve assembly may include an outer pole. The outer pole may include an aperture for receiving the armature, and movement of the armature may be guided by the aperture. The outer pole may be arranged to retain the core member. For example, the core member may comprise a flange, and the outer pole may include a slot to receive the flange. The outer pole may be generally cup-shaped. For example, in one embodiment, the outer pole includes a base, and the base includes the aperture through which the armature is received.

The inlet valve assembly of the present invention is preferably adapted for use with a pump head of a high-pressure fuel pump. To this end, the inlet valve assembly may be adapted to engage with a housing of a pump head. For example, when the inlet valve assembly includes an outer pole, the outer pole may comprise a mounting flange for mounting the inlet valve assembly to the pump head housing.

A pump head for a high pressure fuel pump, comprising an inlet valve assembly according to the above-described aspect of the invention may also be provided. Furthermore, a fuel pump having at least one such pump head can also be contemplated.

BRIEF DESCRIPTION OF THE DRAWINGS

Embodiments of the present invention will now be described, by way of example only, with reference to the accompanying drawings, in which like reference numerals are used for like features, and in which.

Throughout this description, terms such as "upper" and "lower" will be used with reference to the position of the parts as shown in the accompanying drawings. It will be appreciated, however, that the parts could adopt different orientations in use.

DETAILED DESCRIPTION OF EMBODIMENTS OF THE INVENTION

Figure 1:
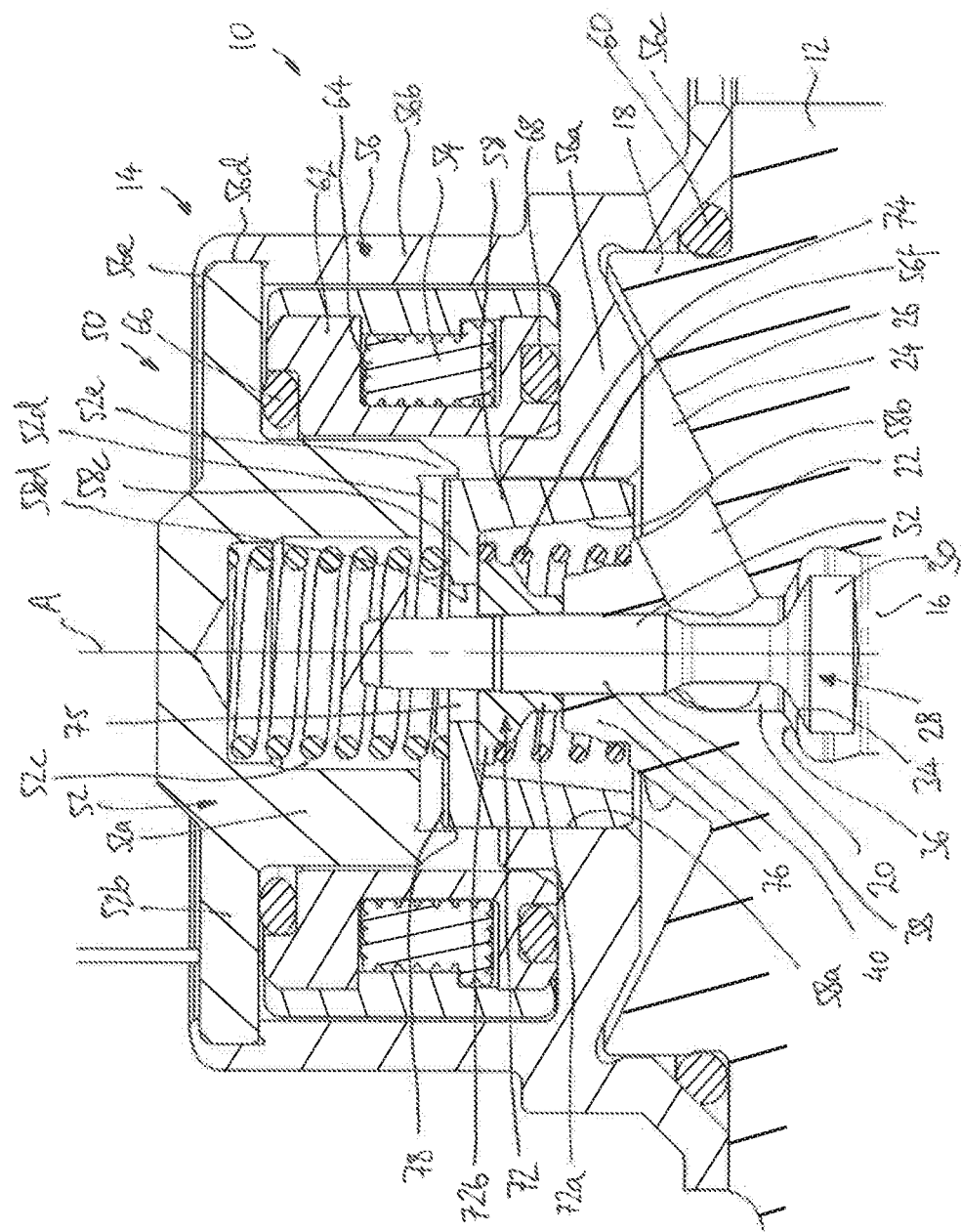
FIG. 1 is a cross-sectional view of part of a pump head having an inlet valve assembly according to an embodiment of the present invention, with the inlet valve assembly in an open position.

FIG. 1 shows, in part, a pump head 10 comprising a head housing 12 and an inlet valve assembly 14 mounted on the head housing 12. Although not shown in FIG. 1, the head housing 12 defines a plunger bore for receiving a plunger that reciprocates in use along a pumping axis A to cyclically increase and decrease the volume of a pumping chamber 16 (only the upper end of which can be seen in FIG. 1).

The upper end of the head housing 12 comprises a generally cylindrical turret portion 18. As will be explained in more detail below, parts of the inlet valve assembly 14 cooperate with the turret to connect the inlet valve assembly 14 to the head housing 12.

The pumping chamber 16 is formed as a bore in the head housing 12. During a return stroke of the plunger, fuel can be drawn into the pumping chamber 16 by way of an inlet bore 20. The inlet bore 20 communicates, by way of a drilling 22, with an annular space 24 formed by an annular v-shaped groove 26 in the top of the turret portion 18. The annular space 24 receives fuel at low pressure by way of inlet passages (not shown).

The flow of fuel between the inlet bore 20 and the pumping chamber 16 is regulated by a poppet valve member 28 of the inlet valve assembly 14. At its lowest end, the valve member 28 is formed into a valve head 30 with a relatively large diameter. The remainder of the valve member 28 forms a valve stem 32. A frustoconical seating surface 34 extends from the valve head 30 to the valve stem 32, and the seating surface 34 is engageable with a frustoconical valve seat 36 formed in the head housing 12 where the pumping chamber 16 meets the inlet bore 20. In FIG. 1, the valve member 28 is shown in its open position, with the seating surface 34 disengaged from the valve seat 36 to allow fuel to enter the pumping chamber 16.

The stem 32 of the valve member 28 extends upwardly from the valve head 30 through a guide bore 38 formed in the head housing 12. A guide portion 40 of the stem 32 has a suitable diameter to form a sliding fit in the guide bore 38, so that movement of the valve member 28 is guided in an axial direction. The guide bore 38, and hence the direction of movement of the valve member 28, is coaxial with the pumping axis A.

An upper portion of the stem 32 of the valve member 28 emerges from the head housing 12 and, as will now be described, engages with an actuator arrangement 50 of the valve assembly 14 that can be used to control movement of the valve member 28.

The actuator arrangement 50 generally comprises a core member 52, a solenoid coil 54, an outer pole 56, and a moveable armature 58. The outer pole 56 is mounted to the head housing 12 and is arranged to retain the core member 52 in a position spaced from the head housing 12, and the coil 54 and the armature 58 are disposed between the core member 52 and the head housing 12.

The outer pole 56 comprises a generally cup-shaped body having a base 56a and a generally cylindrical wall 56b extending upwardly from the base 56a. A mounting flange or lip 56c extends downwardly from the base 56a to embrace the turret portion 18 of the head housing 12. An o-ring 60 forms a seal between the turret portion 18 and a chamfered part of the lip 56c, to prevent fuel leakage from the valve assembly 14.

The core member 52 comprises a generally tubular central portion 52a, surrounded by an annular flange 52b. The flange 52b extends outwardly from the central portion 52a to mate with an annular slot 56d formed in the inside surface of the wall 56b of the outer pole 56. The uppermost edge 56e of the wall 56b is crimped over the flange 52b to retain the flange 52b in the slot 56d.

The coil 54 is wound around a coil former 62, preferably of plastics material. The coil former 62 is ring-shaped, and the central portion 52a of the core member 52 is received in the centre of the ring. The coil former 62 therefore surrounds the central portion 52a of the core member 52, and is disposed between the flange 52b of the core member 52 and the base 56a of the outer pole 56. The coil 54 is received within an annular channel 64 formed in the outer face of the coil former 62.

The centre of the coil former 62 is in fluid communication with the annular space 24 through which low-pressure fuel is delivered to the pumping chamber 16. To prevent leakage of fuel, the coil former 62 forms a seal with the flange 52b of the core member 52 at its upper end and with the base 56a of the outer pole 56 at its lower end, with respective o-rings 66, 68 being provided to effect the seals. By virtue of these o-rings 66, 68, and the o-ring 60 that forms a seal between the outer pole 56 and the head housing 12, fuel cannot leak from the valve assembly 14.

The armature 58 is generally tubular, having an outer wall 58a and an inner bore 58b through which the stem 32 of the valve member 28 extends. One end of the armature 58, closest to the core member 52 (i.e. the upper end of the armature 58 in FIG. 1) is partially closed by an inwardly-directed flange 58c, defining a central aperture 58d through which the stem 32 of the valve member 28 extends. The diameter of the aperture 58d is larger than the diameter of the stem 32, so as to define an annular clearance 75 between the armature 58 and the valve member 28. The armature 58 is not fixedly connected to the valve member 28, but instead the flange 58c of the armature 58 cooperates with the valve member 28 to control movement of the valve member 28 as will be explained below.

The base 56a of the outer pole 56 includes a central aperture 56f for receiving the armature 58. The outer wall 58a of the armature 58 is in sliding contact with the wall of the aperture 56f, so that the outer pole 56 guides axial movement of the armature 58 in use.

The tubular central portion 52a of the core member 52 extends downwardly, towards the armature 58. At its upper end, the tube that forms the central portion 52a is closed, so that the core member 52 acts as a cap for the valve assembly 14, and defines a cavity 52c within the central portion 52a for receiving a first biasing spring 70 for the valve member 28.

An upper end of the first spring 70 bears against the core member 52 at the closed end of the cavity 52c, whilst an opposite, lower end of the first spring 70 acts against the upper surface of the flange 58c of the armature 58. In turn, the lower surface of the flange 58c of the armature 58 bears upon a collar 72 mounted on the stem 32 of the valve member 28. In this way, the first spring 70 applies a first spring force to the valve member 28 that acts in the opening direction of the valve member 28.

The collar 72 comprises a sleeve with a stepped outer diameter. The collar 72 is press-fitted onto the stem 32 of the valve member 28. At its lowermost end, a relatively small-diameter section 72a of the collar 72 acts as a stop member for the valve member 28. The lower surface of the small-diameter section 72a is arranged to abut a raised, central portion 76 of the turret 18 of the head housing 12 when the valve member 28 is in its open position, as shown in FIG. 1, thereby to limit the opening movement of the valve member 28.

The uppermost end of the collar 72 is formed into a relatively large diameter seat section 72b. A second biasing spring 74 is received in the bore 58b of the armature 58. An upper end of the second spring 74 acts upwardly on the lower surface of the seat section 72b of the collar 72, and a lower end of the second spring locates on the raised portion 76 of the turret 18 and bears against the head housing 12. The second spring 74 therefore applies a second spring force to the valve member 28 that acts in the closing direction of the valve member 28.

With the valve member 28 in its fully-open position, as shown in FIG. 1, the flange 58c of the armature 58 bears against the upper surface of the collar 72, which in turn abuts the raised portion 76 of the turret 18 of the head housing 12. Therefore the collar 72 also limits movement of the armature 58 away from the core member 52.

The first and second biasing springs 70, 74 apply forces in opposite directions to the valve member 28. As will be explained in more detail below, the second spring 74 is arranged always to act on the valve member 28, providing a constant biasing force to the valve member 28 in the closing direction. However, the force applied to the valve member 28 by the first biasing spring 70, which acts in the opening direction, can be removed by operation of the actuator arrangement 50.

The opening force applied to the valve member 28 by the first biasing spring 70 when the coil 54 is not energised is greater than the closing force applied to the valve member 28 by the second biasing spring 74. Therefore, when the coil 54 is not energised, the valve member 28 is biased into its open position as shown in FIG. 1, thereby to permit fuel to flow into the pumping chamber 16 from the inlet bore 20.

As will be appreciated from FIG. 1, the internal diameter of the aperture 58d of the armature 58 is larger than the diameter of valve member stem 32. The flange 58c of the armature 58 does not therefore constrain the valve member 28 in the radial direction.

To accommodate axial movement of the armature 58 towards the core member 52 (upwards in FIG. 1), the lowermost face of the central portion 52a of the core member 52 includes a recess 52d. The outer edge of the recess 52d is defined by a downwardly-extended portion 52e of the core member 52, in the form of an annular ridge or horn.

When the armature 58 is in its lowest, fully-open position with the flange 58c resting on the collar 72, as shown in FIG. 1, the lowermost tip of the downwardly-extended portion 52e overlaps with the top of the armature 58 over a relatively short distance. When the coil 54 is energised to move the armature 58 upwards towards the core member 52, as will be explained in more detail below, the recess 52d receives the top end of the armature 58 and the extended portion 52e overlaps with the armature 58 over a longer distance.

The inside diameter of the recess 52d is larger than the outside diameter of the armature 58, so that there is no radial contact between the armature 58 and the core member 52. Furthermore, a washer or spacer 78 of non-magnetic material is provided on the top face of the armature 58, to prevent direct contact between the armature 58 and the core member 52.

The core member 52, the outer pole 56 and the armature 58 are preferably formed from a ferromagnetic material, such as mild steel. In this way, when the coil 54 is energised, the resulting magnetic flux is contained within a magnetic circuit defined by these ferromagnetic components. The collar 72 is made from a non-magnetic material, such as an austenitic stainless steel, which helps to stop the magnetic circuit from straying out of the armature 58 and into the valve member 28.

Figure 2A:
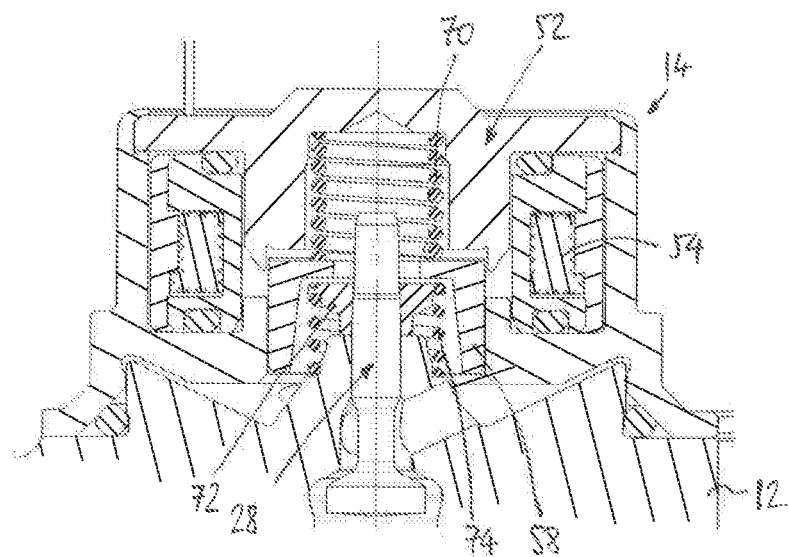
FIG. 2(a) is a cross-sectional view of the pump head of FIG. 1, with the inlet valve assembly in an intermediate position.
Figure 2B:
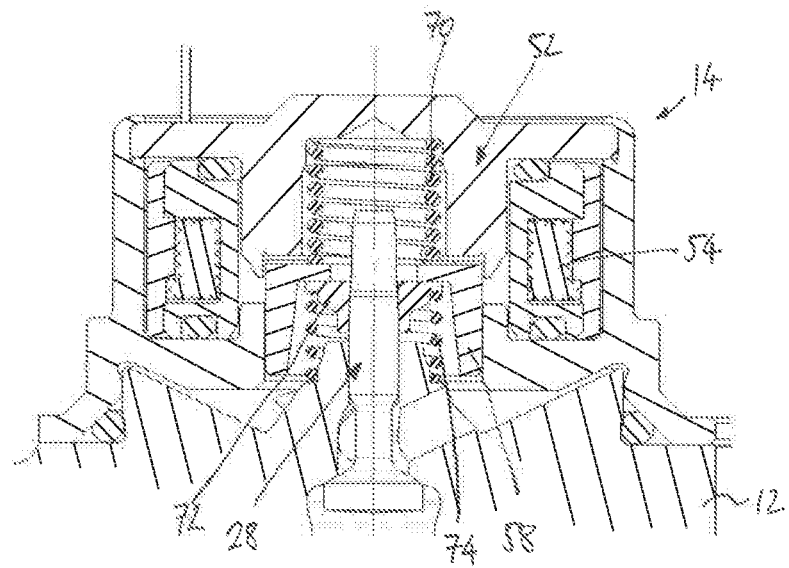
FIG. 2(b) is a cross-sectional view of the pump head of FIG. 1, with the inlet valve assembly in a closed position.

Referring additionally to FIGS. 2(a) and 2(b), operation of the inlet valve assembly 14 will now be described.

As explained above, when the coil 54 is de-energised, the first spring 70 applies an opening force to the valve member 28, by way of the armature 58 and the collar 72, which exceeds the closing force applied to the valve member 28 by the second spring 74. Therefore the net spring force acting on the valve member 28 acts in an opening direction to bias the valve member 28 into its open position, as shown in FIG. 1.

When the coil 54 is energised, the armature 58 moves towards the core member 52, compressing the first spring 70. This has the effect of removing the first (opening) force, applied by the first spring 70, from the valve member 28. As movement of the armature 58 begins, the armature 58 may decouple from the collar 74, as shown in FIG. 2(a), to separate physically the first spring 70 from the valve member 28.

Because the first spring 70 no longer applies a force to the valve member 28 in the opening direction, the net spring force applied to the valve member 28 becomes equal to the closing force applied by the second spring 74. In other words, the net force acting on the valve member 28 changes direction when the coil 54 is energised, causing the valve member 28 to move into its closed position.

As shown in FIG. 2(b), closing movement of the valve member 28 stops when the seating surface 34 of the valve member 28 meets the valve seat 36. In the illustrated embodiment, further upward movement of the armature 58 is limited by the ability of the actuator arrangement 50 to compress the first spring 70, leaving a relatively small clearance between the top of the armature 58 and the core member 52 in the axial direction. Although not clearly shown in FIG. 2(b), when the valve member 28 is seated and the first spring 70 is retracted to its fullest extent, a small clearance is present between the armature 58 and the collar 72, so that the armature 58 remains disengaged from the valve member 28.

Advantageously, because the armature 58 is decoupled from the valve member 28 during closing of the valve member 28, movement of the armature 58 can occur without being constrained by the valve member 28. Consequently, any variations in concentricity and/or alignment between the valve member 28 and the armature 58 can be accommodated without any adverse effect on the operation of the valve assembly 14. Said another way, because the armature 58 is decoupled from the valve member 28 during a first phase of operation of the valve assembly, additional axial and radial degrees of freedom of movement are present compared to conventional arrangements in which the armature is fixedly attached to the valve member. These additional degrees of freedom allow compensation for misalignment and dimensional variations due to manufacturing tolerances.

Another advantage of the present invention is that the air gap between the armature 58 and the core member 52 is not directly linked to the range of movement of the valve member 28. In particular, wear of the seating surface 34 of the valve member 28 and/or the valve seat 36 of the head housing 12 does not change the distance over which the armature 58 must move to remove the force of the first spring 70 from the valve member 28. As a result, the inlet valve arrangement of the present invention is more controllable and less susceptible to performance degradation over its service life than arrangements in which an armature is directly attached to a valve member.

Furthermore, because the extended portion 52e of the core member 52 (see FIG. 1), overlaps with the armature 58, the magnetic flux is guided into the armature 58 in a more efficient manner than would be the case if the extended portion 52e were not present (i.e. if the lower face of the central portion 52a of the core member 52 were planar). Therefore the actuator arrangement of the embodiment of FIG. 1 is effective even when the air gap between the armature 58 and the core member 52 is relatively large when the valve member 28 is fully open. Advantageously, this allows the clearance between the seating surface 34 of the valve member 28 and the valve seat 36 to be maximised, so as to provide a high flow rate of fuel into the pumping chamber 16 during the filling stroke of the pumping element.

In use, the inlet valve assembly may be operated as follows. To fill the pumping chamber 16 during the filling stroke of the plunger, in which the plunger moves to increase the volume of the pumping chamber 16, the coil 54 is de-energised. As shown in FIG. 1, the valve member 28 is held in its open position by the first biasing spring 70, which overcomes the counteracting force of the second biasing spring 74. Fuel is drawn into the pumping chamber 16 past the open valve member 28 as a result of the increase in volume of the pumping chamber 16.

An electronic control unit of the engine calculates the quantity of fuel that should be permitted to enter the pumping chamber 16 during each filling stroke, according to the current rail pressure and the demand for fuel based on the prevailing engine operating conditions. Once the valve member 28 has been in its open position for a sufficient portion of the filling stroke to admit the desired quantity of fuel, the coil 54 is energised in response to a signal from the electronic control unit. Movement of the armature 58 compresses the first spring 70, allowing the valve member 28 to close under the influence of the second spring 74 alone.

Once the plunger has completed its filling stroke, the pumping stroke of the plunger begins to decrease the volume of the pumping chamber 16, thereby to increase the pressure of fuel in the pumping chamber 16. Flow of fuel out of the pumping chamber 16 through the inlet valve is prevented by the seated valve member 28. At this point, the coil 54 can be de-energised to save energy: the fuel pressure in the pumping chamber 16 applies a force to the valve member 28 in the closing direction, which, in combination with the closing force applied by the second spring 74, becomes sufficient to overcome the opening force applied to the valve member 28 by the first spring 70. The valve member 28 therefore remains in its closed position as a result of the fuel pressure in the pumping chamber 16.

The high-pressure fuel in the pumping chamber 16 is expelled through an outlet valve (not shown) of the pump head, which opens at a pre-determined pressure. As the pumping stroke ends and the filling stroke begins, the fuel pressure acting on the valve member 28 drops and the first biasing spring 70 causes the valve member 28 to move back into its open position, as shown in FIG. 1, to admit fuel into the pumping chamber 16 once more.

In the illustrated embodiment of the invention, the armature 58 becomes spaced apart from the collar 72 when the coil 54 is energised (see FIG. 2(a)). It will be appreciated, however, that the armature 58 may remain in contact with the collar 72 during part or all of the closing movement of the valve member 28. In such an arrangement, the benefit of the invention is still achieved because the armature 58 compresses the first spring 70, thereby relieving the valve member 28 of the force due to the first spring 70.

Movement of the armature 58 towards the core member 52 may be limited by the ability of the actuator arrangement 50 to compress the first spring 70, as described above. In alternative arrangements, movement of the armature 58 towards the core member 52 may be halted when the coils of the first spring 70 touch one another, or when the spacer 78 contacts the core member 58. In the latter case, the non-magnetic nature of the spacer 78 helps to prevent the armature 58 from sticking to the core member 52 when the coil 54 is de-energised.

Conceivably, alternative actuators could be provided to retract the first spring away from the valve member. For example, an hydraulic actuator or cam-driven actuator could be employed instead of an electromagnetic actuator.

Whilst the inlet valve assemblies described above are of the normally-open type, it would also be conceivable to provide an inlet valve assembly of the normally-closed type, in which the actuator is arranged to remove the second force from the valve member to open the valve. In general terms, therefore, an inlet valve assembly for a high-pressure fuel pump may comprise an inlet valve member moveable between open and closed positions to control the fuel flow from a source of low-pressure fuel to a pumping chamber of the fuel pump, a first biasing spring arranged to apply a first force to the valve member in an opening direction, a second biasing spring arranged to apply a second force to the valve member in a closing direction, and an actuator arrangement operable to remove the either the first force or the second force from the valve member.

It will be appreciated that further modifications and variations not explicitly described above are also possible without departing from the scope of the invention as defined in the appended claims.

The invention claimed is:

1. An inlet valve assembly for a high-pressure fuel pump, comprising:
    an inlet valve member moveable between open and closed positions to control the fuel flow from a source of low-pressure fuel to a pumping chamber of the fuel pump;
    a first biasing spring arranged to apply a first force to the valve member in an opening direction;
    a second biasing spring arranged to apply a second force to the valve member in a closing direction; and
    an actuator arrangement operable to completely remove the first force from the valve member, thereby to allow the valve member to move into its closed position;
    wherein the actuator arrangement is an electromagnetic actuator comprising a core member, a solenoid coil, and an armature moveable towards the core member in response to energisation of the coil, wherein movement of the armature in response to energisation of the coil removes the first force from the valve member and wherein the armature is separated from the valve member by an annular clearance defined by the armature and the valve member.

2. An inlet valve assembly according to claim 1, wherein the actuator arrangement is operable to retract the first biasing spring towards the core member.

3. An inlet valve assembly according to claim 1, wherein the first spring biases the armature into engagement with the valve member.

4. An inlet valve assembly according to claim 3, wherein the armature engages with a collar of the valve member.

5. An inlet valve assembly according to claim 4, wherein the collar comprises a spring seat for the second spring.

6. An inlet valve assembly according to claim 4, wherein the collar comprises a lift stop for limiting the opening movement of the valve member.

7. An inlet valve assembly according to claim 4, wherein the collar is formed from a non-magnetic material.

8. An inlet valve assembly according to claim 3, wherein the armature disengages from the valve member when the valve member is in its closed position.

9. An inlet valve assembly according to claim 1, further comprising a non-magnetic spacer member disposed between the armature and the core member.

10. An inlet valve assembly according to claim 1, wherein the core member includes an extended portion that overlaps with the armature during at least a part of the range of movement of the armature.

11. An inlet valve assembly according to claim 10, wherein the extended portion comprises an annular projection that extends from a face of the core member.

12. An inlet valve assembly according to claim 10, wherein the extended portion defines a recess that receives, in part, the armature.

13. An inlet valve assembly according to claim 1, wherein the actuator arrangement comprises an outer pole, and wherein the outer pole includes an aperture for receiving the armature.

14. An inlet valve assembly according to claim 1, wherein the annular clearance allows the valve member to move within the armature and relative to the armature in the closing direction.

15. An inlet valve assembly according to claim 1, wherein the armature circumferentially surrounds the valve member.

16. An inlet valve assembly according to claim 1, wherein the valve member extends into the armature.

17. An inlet valve assembly according to claim 1, wherein the first biasing spring is arranged to compress the second biasing spring when the coil is de-energized, thereby to allow the valve member to move into its open position such that the second biasing spring is compressed more in the open position compared to the closed position.

* * * * *